United States Patent

Sawamura

Patent Number: 5,864,693
Date of Patent: Jan. 26, 1999

[54] MOVEMENT CONTROL METHOD AND CHAOTIC INFORMATION PROCESSING UNIT USING CHAOTIC NEURAL NETWORK, AND GROUP MOVEMENT CONTROL METHOD

[75] Inventor: Tsuguo Sawamura, Chigasaki, Japan

[73] Assignees: Nikon Corporation, Tokyo, Japan; Nikon Systems Inc., Yokohama, Japan

[21] Appl. No.: 515,970

[22] Filed: Aug. 16, 1995

[30] Foreign Application Priority Data

Aug. 18, 1994 [JP] Japan .................................. 6-194370
Jul. 26, 1995 [JP] Japan .................................. 7-189902

[51] Int. Cl.$^6$ ................................................ G06F 17/16
[52] U.S. Cl. ............................ 395/500; 395/21; 395/24; 364/148; 364/736.06
[58] Field of Search ................................... 364/578, 140, 364/142, 143, 148, 150, 151, 158, 550, 553, 554, 736.06; 395/500, 20, 21, 23, 52, 51, 24

[56] References Cited

U.S. PATENT DOCUMENTS

| | | | |
|---|---|---|---|
| 5,323,471 | 6/1994 | Hayashi | 382/15 |
| 5,355,528 | 10/1994 | Roska et al. | 395/24 |
| 5,432,697 | 7/1995 | Hayes | 364/158 |
| 5,442,510 | 8/1995 | Schwartz et al. | 364/152 |
| 5,493,516 | 2/1996 | Broomhead et al. | 364/553 |
| 5,510,976 | 4/1996 | Tanaka et al. | 364/148 |
| 5,682,901 | 11/1997 | Kamen | 128/706 |

OTHER PUBLICATIONS

Birx et al., "Chaotic Oscillators and Complex Mapping Feed Forward Networks (CMFFNS) for Signal Detection In Noisy Environments", IEEE, 1992, pp. 881–888.

Kuo et al., "Reconstructed Dynamics and Chaoties Signal Modelling", IEEE, 1994, pp. 3131–3136.

*Primary Examiner*—Kevin J. Teska
*Assistant Examiner*—Thai Phan
*Attorney, Agent, or Firm*—Shapiro and Shapiro

[57] ABSTRACT

This invention discloses a method of realizing a variety of movements which are controlled while maintaining their complexity by generating complex movements, which appear irregular at a glance, by the deterministic method. A neural network which connects a plurality of neurons to each other is set. The neurons perform calculations that generate chaotic oscillation, and are set in correspondence with the moving direction of an object. The movement vector of the object is calculated from time-series data obtained by the calculations.

4 Claims, 6 Drawing Sheets

CHAOTIC MOVEMENT OF ONE OBJECT
(ABOUT 2000 STEPS)

DISCRETE DIRECTIONS

OBJECT 1
$I_2(n) = \delta$
$I_k(n) = 0 \; (k \neq 2)$

OBJECT 2
$I_6(n) = \delta$
$I_k(n) = 0 \; (k \neq 6)$ $I_k(n)$: STIMULUS ON k-TH NEURON AT TIME n
$\delta$: INTENSITY OF STIMULUS (CONTROL PARAMETER)

CHASE MOVEMENT OF GROUP CONSISTING OF 30 INDIVIDUALS

MOVEMENT CONTROL METHOD AND CHAOTIC INFORMATION PROCESSING UNIT USING CHAOTIC NEURAL NETWORK, AND GROUP MOVEMENT CONTROL METHOD

BACKGROUND OF THE INVENTION

1. Field of the Invention

The present invention relates to an apparatus having a variety of complex movements generated by the deterministic method and also to a simulator for analyzing the movement of a living body and, more particularly, to a movement control method and an information processing unit for controlling the movement of, e.g., a pseudo living body.

2. Related Background Art

As a conventional method of generating complex movements, a technique of classification based on a procedure group using programs for setting conditions such as IF statements is known. Also, a technique for performing arithmetic control in consideration of indefinite elements using pseudo random numbers is also known.

Furthermore, on the research level, various mathematical models such as (i) a stochastic technique using a distribution function, (ii) a deterministic technique using differential and difference formulas, and the like have been proposed. In recent years, attempts have been made to understand complex systems such as a turbulent flow, brain, and the like using chaos.

However, with the techniques based on the procedures, the number of cases for generating complex movements becomes very large. For this reason, it is difficult to select a movement matching with a particular objective. Also, a partial change influences the entire procedures, resulting in cumbersome operations. Furthermore, with the technique using the pseudo random numbers, movements tend to be monotonous. For this reason, operations for complicatedly combining many random numbers are required to introduce complexity, and it is difficult to attain such operations.

SUMMARY OF THE INVENTION

It is an object of the present invention to solve the above-mentioned problems and to easily realize movements which can reproduce complex movements of, e.g., a living body.

In order to achieve the above object, according to one embodiment of the present invention, the movement vectors of an object are calculated using time-series data obtained by a calculation using chaotic oscillation, and the movement of the object is controlled using the movement vectors.

In another embodiment, a neural network which connects a plurality of neurons to each other is set, the respective neurons are controlled to perform calculations using chaotic oscillation, and the neurons are set in correspondence with the moving directions of an object. Thus, the movement vectors of the object are calculated from time-series data obtained by the calculations, and the movement of the object is controlled using the movement vectors.

In this case, information is externally supplied to a specific neuron in the neural network, and the neuron can perform the calculation using the chaotic oscillation on the basis of the supplied information. In the calculation using chaotic oscillation, the movement vector of an object can be calculated based on formulas below:

$$p_i(n+1) = F_{q_i(n)}\{p_i(n)\}$$

$$q_i(n) = -\frac{1}{T_{ii}}\left\{\sum_{j \ne 1} T_{ij}p_j(n) + \alpha + I_i(n)\right\}$$

$$F_q(p) = \gamma p + (1-\gamma)\left[1 - \frac{1}{2}\left\{1 + \tanh\left(\frac{p-q}{2\beta}\right)\right\}\right]$$

where $p_i$ is the internal buffer of the i-th neuron, $T_{ij}$ is the synaptic connection from the j-th neuron to the i-th neuron, $I_i$ is external information to the i-th neuron, $q_i$ is the intermediate function, $F_q$ is the function for determining the next state of each neuron, n is lapse of discrete time, $\alpha$ is the offset value, $\beta$ is the gain, and $\gamma$ is the attenuation coefficient.

In still another embodiment, a chaotic information processing unit comprises a neural network which connects a plurality of chaotically oscillating neurons, and an arithmetic device for calculating the states of internal buffers of the respective neurons at a given timing upon development of the neural network with time, and calculating movement vectors for determining the movement of an object on the basis of the calculated states.

In still another embodiment, the chaotic information processing unit further comprises an input section for inputting externally supplied information to a specific neuron in the neural network, and the arithmetic device performs a calculation using chaotic oscillation on the basis of the input information and the value of the internal buffer.

In this case, the calculation using chaotic oscillation can be set to calculate the movement vectors of an object on the basis of formulas below:

$$p_i(n+1) = F_{q_i(n)}\{p_i(n)\}$$

$$q_i(n) = -\frac{1}{T_{ii}}\left\{\sum_{j \ne 1} T_{ij}p_j(n) + \alpha + I_i(n)\right\}$$

$$F_q(p) = \gamma p + (1-\gamma)\left[1 - \frac{1}{2}\left\{1 + \tanh\left(\frac{p-q}{2\beta}\right)\right\}\right]$$

where $p_i$ is the internal buffer of the i-th neuron, $T_{ij}$ is the synaptic connection from the j-th neuron to the i-th neuron, $I_i$ is external information to the i-th neuron, $q_i$ is the intermediate function, $F_q$ is the function for determining the next state of each neuron, n is lapse of discrete time, $\alpha$ is the offset value, $\beta$ is the gain, and $\gamma$ is the attenuation coefficient.

The chaotic information processing unit further comprises a device for calculating an influence on individual ones of a plurality of moving objects from other objects or an influence of an external environment, and the calculated influence is supplied as information to a specific neuron in a neural network of a predetermined one of the plurality of objects, thereby calculating movement vectors that can realize controlled movements as a whole while maintaining their complexity.

In still another embodiment, the chaotic information processing unit and an information transfer apparatus are arranged, and a plurality of movable objects movement-controlled by the processing unit are prepared. In addition, information is transferred among the objects by the information transfer apparatus. In a neural network of each object, the calculation using chaotic oscillation is performed on the basis of the information and the value of the internal buffer, thereby calculating the movement vectors of the object. The movements of the respective objects are controlled by the calculated movement vectors.

According to the present invention, using the complexity implicated by chaos, complex movements are spontaneously generated by a simple model. The generated complex movements are interacted to make them limit each other. Thus, a variety of controlled movements can be easily realized.

According to the present invention, each neuron of the neural network performs a calculation using chaotic oscillation. In this case, the magnitude (to be referred to as a firing rate hereinafter) of the value of the internal buffer $p_i$ of each neuron becomes chaos. By the transfer function upon synaptic connection of neurons, the firing rates of the neurons are associated with each other. Thus, the state of the firing rate (to be referred to as a firing state hereinafter) can be sequentially transferred to the neurons.

Furthermore, the neurons are set in correspondence with the moving directions of a moving object, and a sum vector is calculated using the firing rates as the magnitudes of vectors. As a result, a synthesized vector which defines an irregular moving direction and moving speed depending on the firing states of the neurons can be obtained. By applying a stimulus (external information) to a specific neuron, movements in a specific direction implicating irregularities can be generated.

Furthermore, an information processing unit which defines and calculates the moving direction, moving speed, and the like depending on the firing patterns of a neural network which connects a plurality of chaotically oscillating neurons can be realized. This information processing unit can detect the movement result of a complex moving object by setting a simple input.

An information processing unit, which applies a stimulus from an external environment to a specific neuron, can easily calculate emulation models of complex movements.

DESCRIPTION OF THE PREFERRED EMBODIMENTS (First Embodiment)

Figure 1:
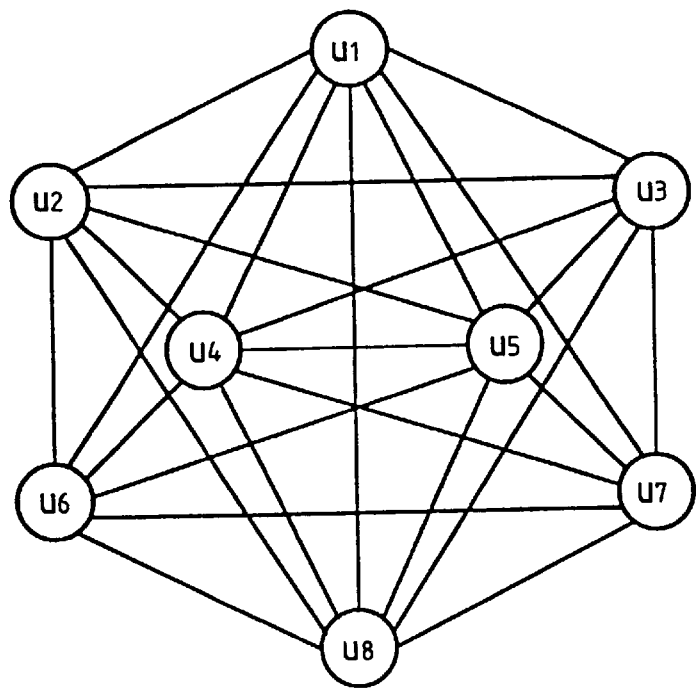
FIG. 1 is a schematic view of a neural network constituted by eight neurons.
Figure 2:
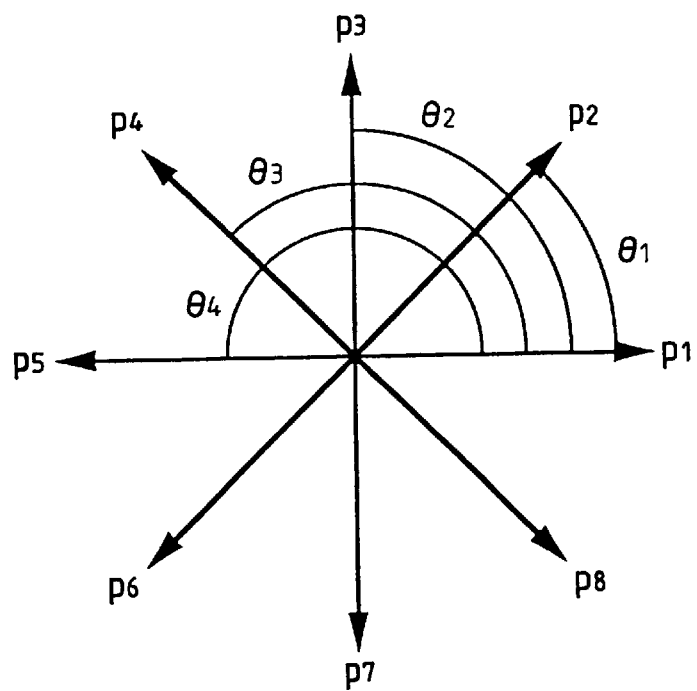
FIG. 2 is an explanatory view of conversion of the value of an internal buffer of each neuron into a direction and speed.

In this embodiment, as shown in FIG. 1, eight neurons are synaptically connected. In FIG. 1, ui indicates the i-th chaotic neuron, and lines connecting ui and uj indicate synaptic connections. The neurons are set in correspondence with eight directions, as shown in FIG. 2. In FIG. 2, $p_i$ indicates the value of an internal buffer of the i-th neuron, and $\theta_i$ indicates the angle formed between the x-axis and the vector $p_i$. Thus, an information processing unit which performs calculations using the firing rates of the neurons as the magnitudes of vectors indicating the respective directions, and a control method therefor are realized.

The neural network constituted by the eight neurons makes control for determining the movements of one object. The neural network for determining the movements of one object is expressed by, e.g., difference formulas below:

$$p_i(n+1) = F_{q_i(n)}\{p_i(n)\}$$

$$q_i(n) = -\frac{1}{T_{ii}}\left\{\sum_{j \neq 1} T_{ij}p_j(n) + \alpha + I_i(n)\right\}$$

$$F_q(p) = \gamma p + (1-\gamma)\left[1 - \frac{1}{2}\left\{1 + \tanh\left(\frac{p-q}{2\beta}\right)\right\}\right]$$

where $p_i$: the internal buffer of the i-th neuron $T_{ij}$: the synaptic connection from the j-th neuron to the i-th neuron $I_i$: external information to the i-th neuron $q_i$: the intermediate function $F_q$: the function for determining the next state of each neuron n: lapse of discrete time $\alpha$: the offset value  
$\beta$: the gain value      } control parameters  
$\gamma$: the attenuation coefficient More specifically, the control parameters $\alpha$, $\beta$, and $\gamma$ for determining behaviors of the individual neurons and the synaptic connections $T_{ij}$ between the neurons are appropriately determined. The values of the internal buffers $p_1, \ldots, p_8$ of the neurons are assigned randomly in the range from 0.0 to 1.0, and are developed with time, thus generating chaotic oscillation of a firing pattern, such that some neurons fire chaotically (the values of the internal buffers $p_i$ increase), and firing of the remaining neurons is suppressed (the values of the internal buffers $p_i$ decrease).

Figure 3:
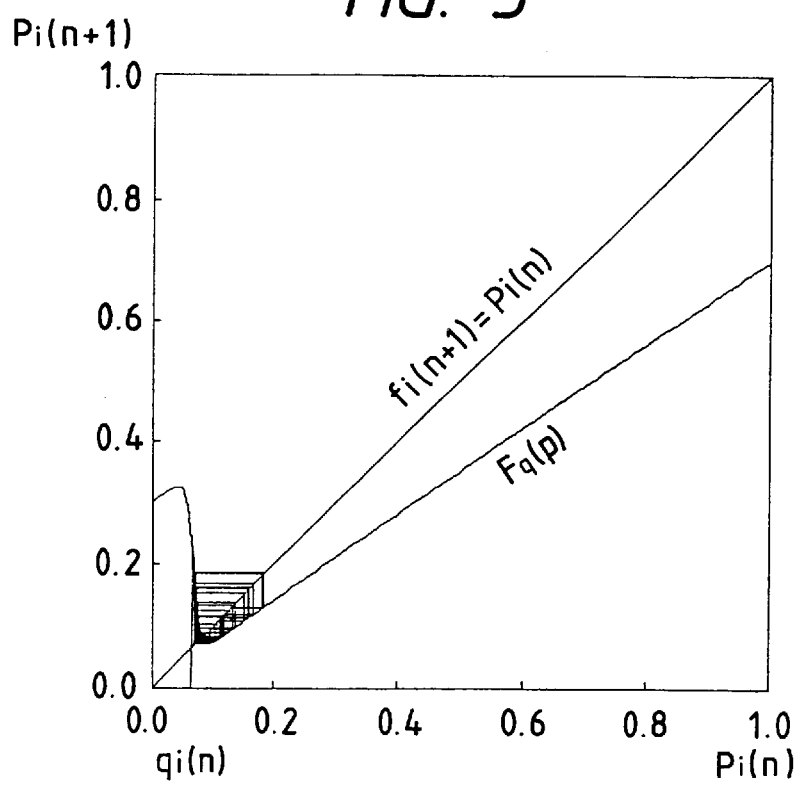
FIG. 3 is a return map showing the chaotic oscillation of each neuron.

Therefore, the firing pattern is often fixed or changes periodically depending on the values of the synaptic connections $T_{ij}$. In this case, when the addition using the synaptic connections $T_{ij}$ or addition of $I_i$ as an external stimulus to a specific neuron is made while the respective neurons perform calculations that generate chaotic oscillation, as shown in the return map in, e.g., FIG. 3, the firing pattern itinerates chaotically.

Note that the values of the control parameters $\alpha$, $\beta$, and $\gamma$ and the synaptic connections $T_{ij}$ used in this embodiment are as follows:

α=0.07

β=0.006

γ=0.7

$$T_{ij} = \begin{cases} -1.0 (i = j) \\ 0.3 (|j - i| = 1 \text{ or } |j - i| = 7) \\ 0.0 (|j - i| = 2 \text{ or } |j - i| = 6) \\ -0.3 (|j - i| = 3 \text{ or } |j - i| = 5) \\ -1.0 (|j - i| = 4) \end{cases}$$

$I_i(n) = 0$

In this embodiment, when the firing pattern of the neurons itinerates chaotically, the pattern remains the same for a while and transits to other patterns as time elapses. Thus, a time change in the firing pattern is observed. The time change can be adjusted by the values of the control parameters α, β, and γ and the synaptic connections $T_{ij}$.

Figure 4:
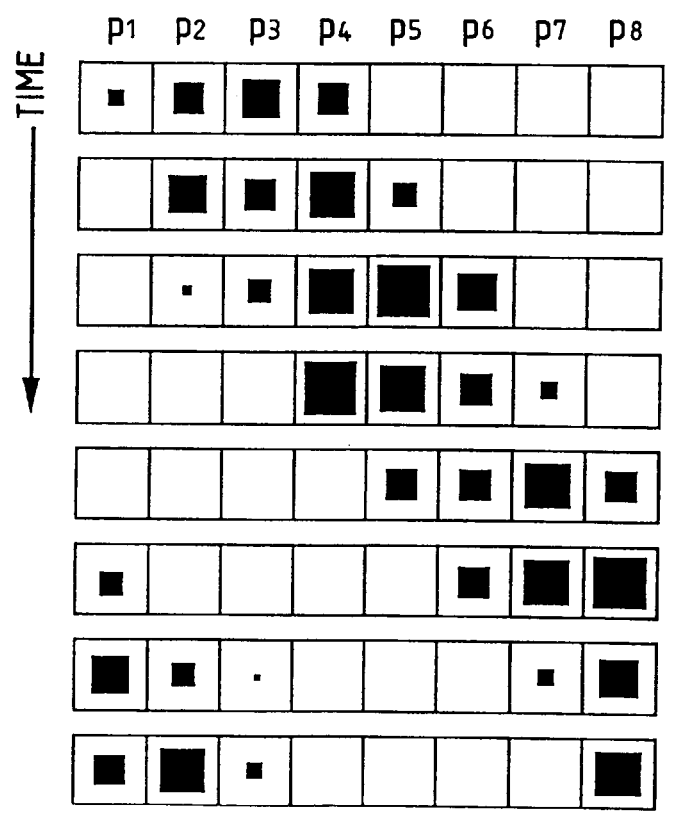
FIG. 4 is a view showing an example of a firing pattern.

With the parameters used in the first example above, the pattern transits to shift, as shown in FIG. 4. That is, the firing state stays in a single pattern for an extended period of time, and transits to another pattern once in a while.

Other examples of the values of the control parameters α, β, and γ and the synaptic connections $T_{ij}$ are as follows:

Second Example

α=0.05

β=0.006

γ=0.7

$$T_{ij} = \begin{cases} -2.0 (i = j) \\ 0.3 (|j - i| = 1 \text{ or } |j - i| = 7) \\ 0.0 (|j - i| = 2 \text{ or } |j - i| = 6) \\ -0.3 (|j - i| = 3 \text{ or } |j - i| = 5) \\ -1.0 (|j - i| = 4) \end{cases}$$

$I_i(n) = 0$

In the second example, all the neurons uniformly fire weakly, and some neurons sometimes fire strongly.

Third Example

α=0.05

β=0.006

γ=0.64

$$T_{ij} = \begin{cases} -1.8 (i = j) \\ 0.3 (|j - i| = 1 \text{ or } |j - i| = 7) \\ 0.0 (|j - i| = 2 \text{ or } |j - i| = 6) \\ -0.3 (|j - i| = 3 \text{ or } |j - i| = 5) \\ -1.0 (|j - i| = 4) \end{cases}$$

$I_i(n) = 0$

In the third example, the firing pattern changes frequently, and a periodic transition sometimes occurs.

Fourth Example

α=0.05

β=0.009

γ=0.5

$$T_{ij} = \begin{cases} -1.5 (i = j) \\ 0.3 (|j - i| = 1 \text{ or } |j - i| = 7) \\ 0.0 (|j - i| = 2 \text{ or } |j - i| = 6) \\ -0.3 (|j - i| = 3 \text{ or } |j - i| = 5) \\ -1.0 (|j - i| = 4) \end{cases}$$

$I_i(n) = 0$

In the fourth example, the total value of the values of the internal buffers of all the neurons largely varies as compared to other examples of the parameters.

Figure 5:
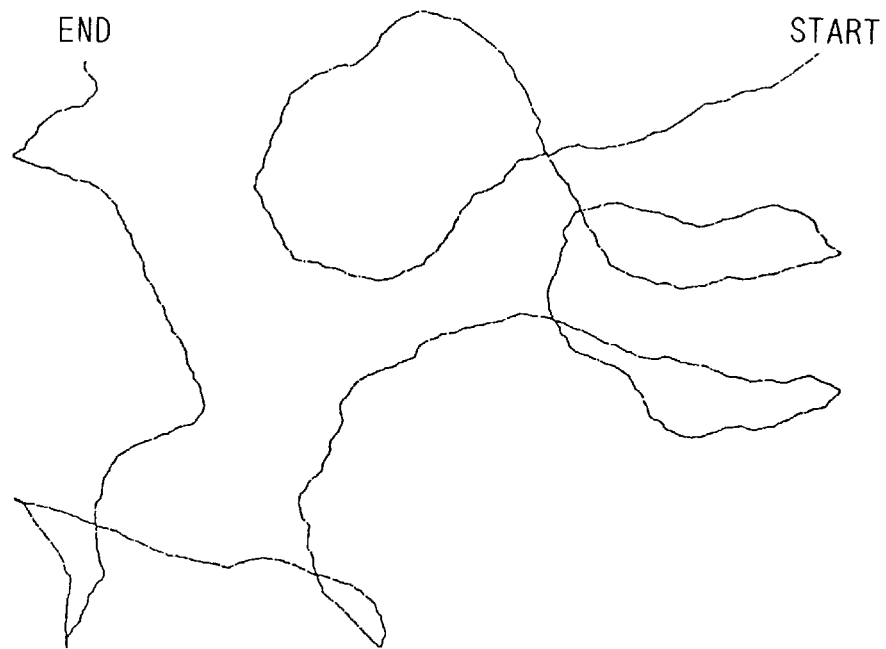
FIG. 5 is a view showing the locus of the movement of one object.

In this manner, by setting the moving speed of a moving object in correspondence with various firing patterns that itinerate chaotically, complex movements can be realized. First, vectors in eight directions are assigned in correspondence with the eight neurons, and the magnitudes of the vectors are determined in correspondence with the values of the internal buffers of the neurons. At this time, the moving speed of one moving object is calculated on the basis of the sum total of the eight vectors using formulas below:

$$v_x(n) = \sum_{k=1}^{8} p_k(n) \cos\theta_k$$

$$v_y(n) = \sum_{k=1}^{8} p_k(n) \sin\theta_k$$

where $v_x$, $v_y$: the x- and y-components of the moving speed $\theta_k$: the angle formed between the vector $p_k$ and the x-axis n: lapse of discrete time More specifically, the moving direction and the moving speed of the moving object are determined in correspondence with the direction and magnitude determined on the basis of the vector sum. When the moving direction of the moving object is calculated using the parameters of the first example, a locus, which appears to be random at a glance, is obtained, as shown in FIG. 5.

With the parameters of the second example, a movement with a comparatively long stop state can be realized. With the parameters of the third example, a movement with many rotations can be realized. With the parameters of the fourth example, a movement including a comparatively linear movement and a stop state can be realized.

In this manner, in the neural network which synaptically connects a plurality of (eight) neurons, the neurons perform calculations that generate chaotic oscillations, and the moving direction and the moving speed of an object are defined by the firing pattern, thus calculating a complex movement, and displaying a complex locus.

Figure 6:
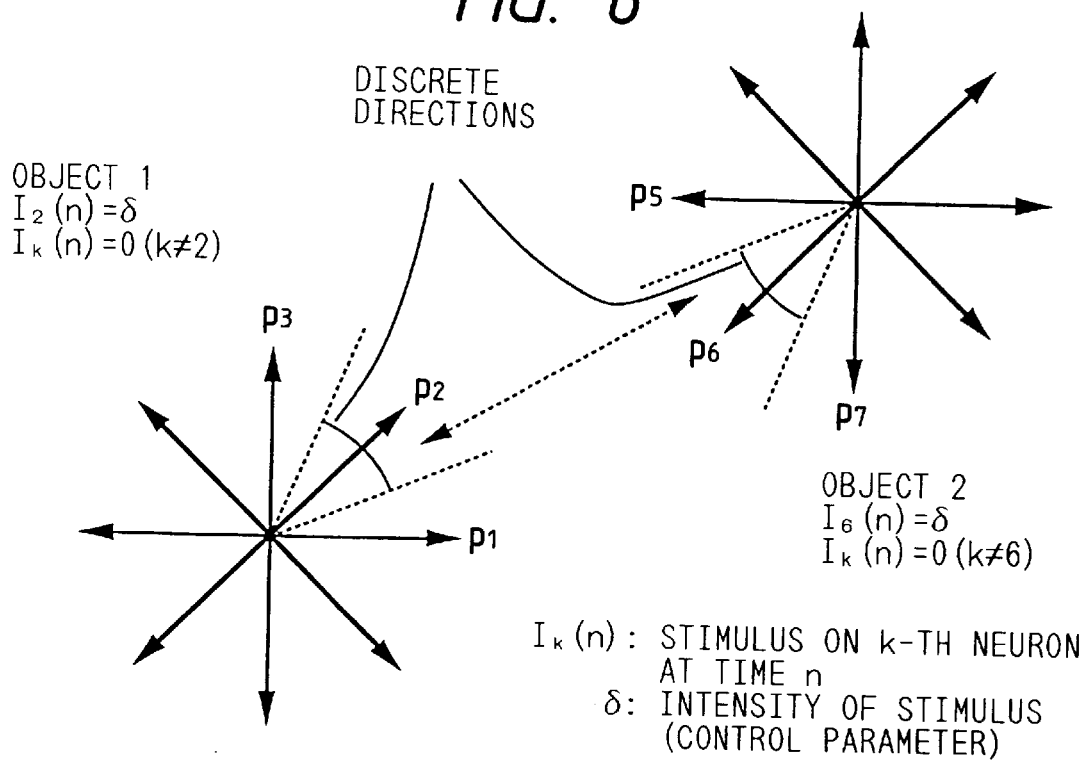
FIG. 6 is an explanatory view of the way of applying stimulus as an interaction between objects.

Upon execution of such calculations, when an external stimulus $I_i$ is applied to a specific neuron, a moving object can be controlled to become close to or be far away from the direction corresponding to the specific neuron. For example, when two moving objects are to be controlled, two neural networks are used, and chaotic calculations and vector calculations are performed in units of neural networks to move the corresponding moving objects. In this case, as shown in FIG. 6, the position (direction) of a specific partner (object 2) when viewed from a given object (object 1) is calculated. Thereafter, the direction of the partner is decomposed into vectors using eight neurons corresponding to the eight directions, and the vectors are converted into discrete directions in correspondence with the directions of the vectors used for defining the moving speed. In this case, when an attractive force is positively applied, a positive value is given as the external stimulus $I_i$ to a neuron in a direction agreeing with the direction of the partner; when a repulsive force is applied, a positive value is given as the external stimulus $I_i$ to a neuron in a direction opposite to the direction of the partner. On the other hand, when an attractive force is negatively applied (when the attractive force is applied as a force for suppressing a movement in a direction to separate), a negative value is given as the stimulus to a neuron in a direction opposite to the direction of the partner; when a repulsive force is applied (when the repulsive force is applied as a force for suppressing a movement in a direction to approach), a negative value is given as the stimulus to a neuron in the direction agreeing with the direction of the partner.

When the movement of one object is controlled in correspondence with the movement of the partner, a positive value is given as the stimulus to a neuron in a direction agreeing with the moving direction of the partner, or a negative value is given as the stimulus to a neuron in a direction opposite to the moving direction of the partner.

When interactions among two or more moving objects are to be realized, the stimulus is accumulated in correspondence with the number of partners. The stimulus values are given as the control parameters $\alpha$, $\beta$, and $\gamma$, and are multiplied with appropriate coefficients such as the distance, sex, and the like, thus realizing various interactions.

As the interactions among the objects, various interactions can be realized by calculations. For example, a chase interaction for moving an object to chase another object, a barycentric interaction for moving a plurality of objects toward the central position of the objects or moving the objects from the central position in discrete directions, attractive and repulsive forces based on sex, imitation of a movement of another object, and the like can be realized. In this embodiment, of these interactions, the chase interaction will be exemplified.

In order to give a chase interaction, no interaction with other objects is set in the first object, i.e., no external stimulus is input to the first object. Attractive forces in specific directions are continuously applied in turn to other N-1 objects other than the first object in such a manner that a positive value is given to a specific neuron of the second object in a direction agreeing with the direction of the first object, a positive value is given to a specific neuron of the third object in a direction agreeing with the direction of the second object, and so on.

Figure 7:
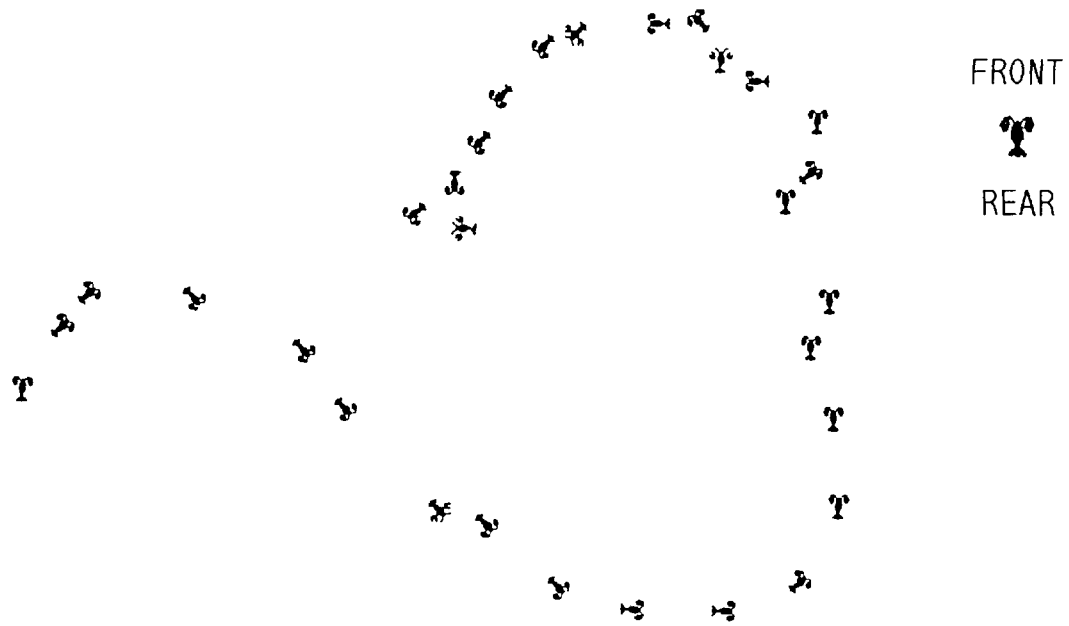
FIG. 7 is a view showing the movement of a group based on a chase interaction.

When these interactions are given and are developed with time, the movement of a group which moves in a line to follow the first object while maintaining the irregular, complex movements of objects can be realized by simulation, as shown in FIG. 7. In addition to the complex movement to control one object to become too close to or separate farther away from another object, various group movements can be formed like that a line of objects is disconnected or recovered, a line of objects forms a ring or a wavy pattern during the movement, and so on. Such movements can be displayed on a monitor by image processing.

In addition to interactions among objects, an interaction with an external environment can be similarly realized by applying a stimulus to a specific neuron.

For example, assuming that the object is a pseudo living body, when the external environment corresponds a preferable one for an object such as a nest, bait, and the like, the stimulus is applied as an attractive force to a neuron in the direction of the external environment; when the external environment corresponds to one to be avoided such as an obstacle, the stimulus is applied as a repulsive force to a corresponding neuron.

Furthermore, as an external environment, boundary conditions serving as walls are defined for four sides, i.e., upper, lower, right, and left sides, and when the object is located inside the boundary, no stimulus is supplied; when the object comes out the boundary, a positive stimulus is kept supplied as an attractive force for moving the object toward the interior of the boundary to neurons in the direction of the boundary.

When a plurality of such apparatuses are prepared, and are operated, if an attractive force toward the interior of the boundary is applied to objects at positions outside the boundary, a group movement similar to the state of frame enclosure can be realized by actual apparatuses.

As described above, an external stimulus is applied to a specific neuron in a neural network in which a plurality of neurons corresponding to the directions from a moving object perform calculations that generate chaotic oscillation, and the moving direction and the moving speed of the moving object are determined on the basis of the firing pattern of the neurons to obtain the locus of the object, thus easily expressing, e.g., a locus that imitates the movement of a living body.

(Second Embodiment)

Figure 8:
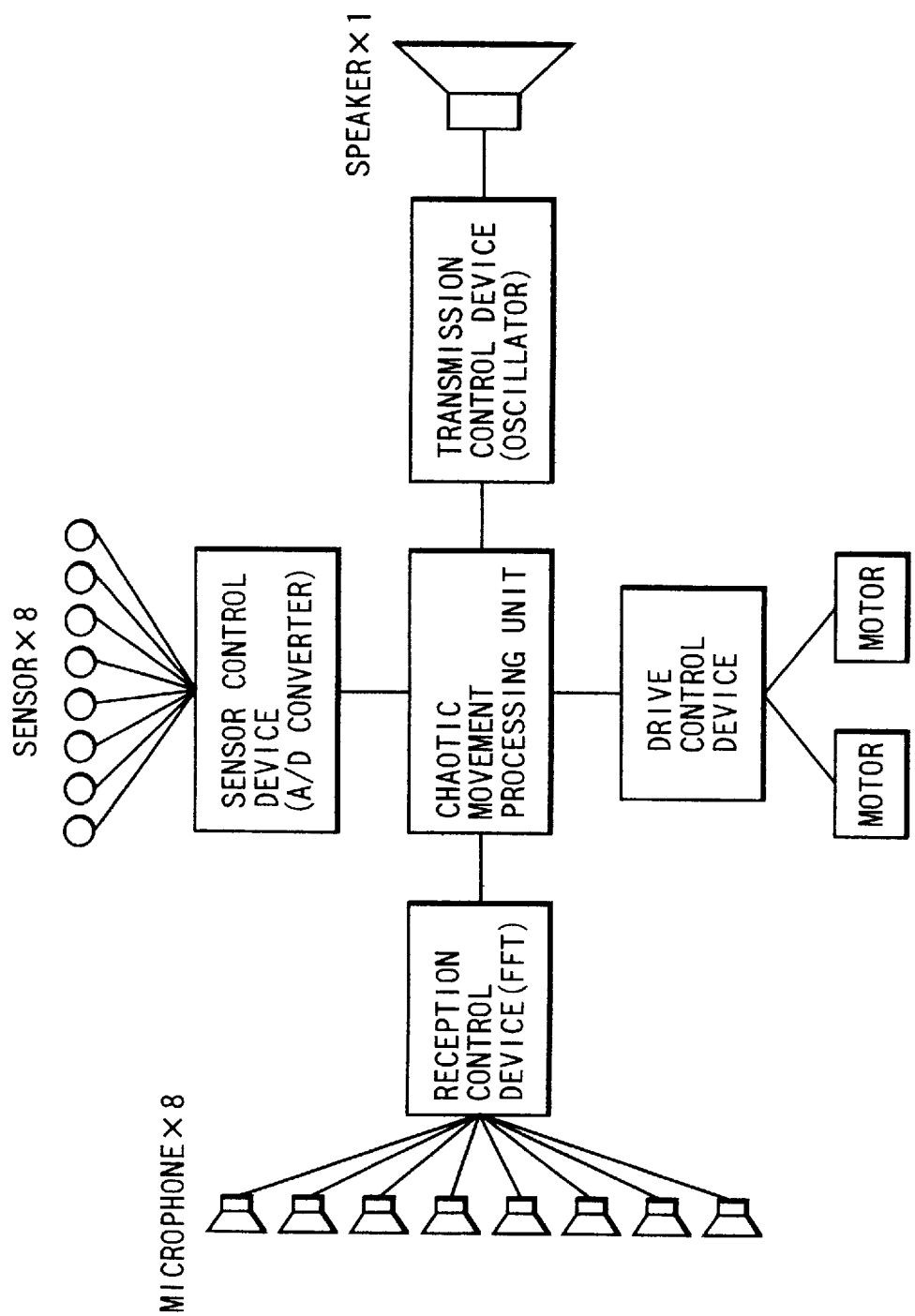
FIG. 8 is a diagram showing the arrangement of a movement model.

FIG. 8 is a schematic diagram showing the arrangement of a movement model comprising a chaotic information processing unit using a single neural network. This movement model has moving means comprising a drive control device for controlling a drive system constituted by motors and wheels, communication means, and environment recognition means, in addition to the chaotic information processing unit. As the motor, a stepping motor advantageous for digital control is used. As the communication means, communication means by means of sonic waves, which is free from disturbance and can be easily made compact, is used. As the environment recognition means, piezoelectric sensors, which can be easily mounted, are used.

In this movement model, the information processing unit with the above-mentioned calculation function is connected to the drive control device for controlling the drive system consisting of two wheels and stepping motors, and means for synthesizing vectors which correspond to eight directions of eight neurons and have magnitudes corresponding to the values of internal buffers of the neurons calculates the moving speed vector at present time (n). The difference (rotation angle) in direction from the moving speed vector one unit time before (n-1) and the moving speed at the present time are supplied as control signals to the drive control device, and an apparatus which moves in a designated direction at a designated speed is realized.

In order to realize an interaction with other movement models as other objects via sonic waves, the movement model has a sound source of a frequency unique to the object, and keeps generating sonic waves via a transmission control device from a nondirective speaker in every directions to have the object as the center. In each movement model, eight directive microphones are disposed in the same directions as those of vectors used for defining the moving directions in correspondence with eight directions so as to receive the sonic waves, and are associated with the neurons in the respective directions via a reception control device.

Furthermore, this movement model has eight piezoelectric sensors for recognizing an environment. These sensors are disposed in the same directions as those of the vectors used for defining the moving directions of the movement model. These piezoelectric sensors are associated with the neurons in the respective directions via a sensor control device. When a given piezoelectric sensor comes in contact with something, a stimulus of a positive value is applied to a neuron associated with a vector in a direction opposite to the disposition direction of the piezoelectric sensor which reacts by the contact. Thus, an external environment, i.e., an obstacle, can be reflected in the movement of the movement model.

Furthermore, this movement model detects the direction of another specific object (movement model) on the basis of the intensities and frequency characteristics of sonic waves received by the microphones. Then, $I_i$ which stimulates a neuron in the corresponding direction as an attractive or repulsive force is set and input to the information processing unit, thereby stimulating the neuron in the corresponding direction. In this manner, since an interaction can be realized between the movement models, various movement patterns can be realized by controlling the drive operations of the movement models.

Figure 9:
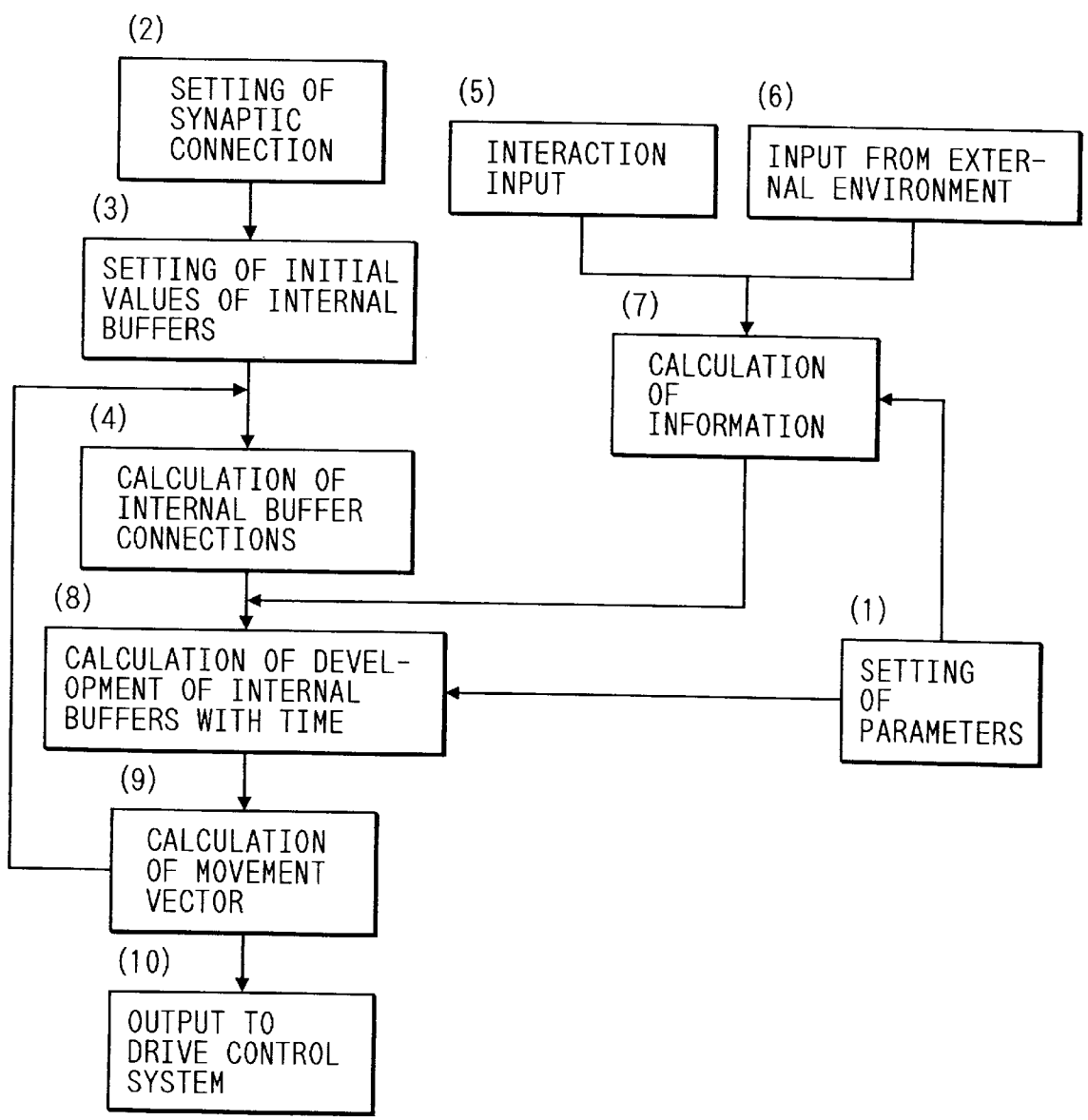
FIG. 9 is a chart showing the processing sequence of a chaotic information processing unit.

FIG. 9 is a schematic flow chart showing the processing sequence of the chaotic information processing unit of this embodiment. Note that the information processing unit can be realized as a chip such as an IC. The processing sequence of the chaotic information processing unit will be described below.

Control parameters $\alpha$, $\beta$, and $\gamma$, a control parameter for determining the intensity of the interaction included in the stimulus $I_i$, and a control parameter for determining the intensity of the influence of an external environment in the above formulas are respectively set. These values are input to the information processing unit (1). On the other hand, synaptic weight values (or connection values) $T_{ij}$ of the formulas above are set (2). The initial values of the internal buffers $p_i$ of all the neurons at time (n=0) are set (3). The initial values are set using random numbers, so that the same time-series data is not obtained by the same parameters. Thereafter, for each neuron, a product obtained by multiplying the value of the internal buffer $p_i$ of another neuron connected to the neuron of interest with the synaptic connection value of the corresponding connection is calculated. A total of such products obtained in correspondence with the number of connections in the neural network is calculated (4). At the same time, based on the input values of a stimulus (5) input via the reception control device and corresponding to an interaction between movement models, and a stimulus (6) input via the sensor control device and corresponding to an external environment, a stimulus value is calculated (7). Using the total of the values of the internal buffers obtained in step (4) and the stimulus value obtained in step (7), the values of the internal buffers of the neurons at the next time (n) are calculated by calculations using the above formulas (8). Thereafter, a movement vector for moving the model is calculated based on the values of the internal buffers of the individual neurons of the neural network using the formulas above (9). The movement vector is output to a drive control system (drive system) via the drive control device (10). During this interval, the processes in steps (4) to (9) are repeated to determine the movement vectors of the movement model at the respective times. When the calculation in step (8) is parallelly and independently performed for each of the neurons, the calculation efficiency can be improved.

Note that the movement model which uses the chaotic movement information processing unit can use a gasoline engine or the like in addition to electric motors, stepping motors, and the like. As the moving means, a ground moving model can use wheels, an air moving model can use injection of an air flow, and a water moving model can use injection of a water flow by means of water pressure, a screw, or the like. Furthermore, as the communication means, in addition to sound, light, radio wave, and the like, an external stimulus may be applied to a specific neuron by means of image recognition using a CCD camera, the types or concentrations of chemical substances in air or water may be detected by, e.g., a gas sensor. As the environment recognition means, infrared ray sensors, acceleration sensors, piezoelectric sensors, or the like may be used.

The number of neurons forming the neural network is not limited to eight, but may be two or more. In consideration of the symmetry of the moving directions and the like, an even number of neurons are preferably used. When a two-dimensional movement is assumed, five or more neurons are preferably used. Since a small number of neurons means a small number of elements for determining the moving direction and the moving speed of an object, the movement of an object tends to be rough. On the other hand, when the number of neurons is too large, the time required for calculating the synthesized vector is prolonged. For these reasons, a preferred result can be obtained when the neural network is formed by eight neurons like in the above embodiments.

As described above, in the movement control method using the chaotic neural network of the present invention, the movement vectors of an object are calculated using calculations that cause chaotic oscillation. For this reason, when the movement of the object is controlled using these movement vectors, a movement which reproduces the complex movement of, e.g., a living body can be easily realized.

When an external stimulus is applied to a specific neuron forming the neural network, the vector sum for determining the moving direction and moving speed of an object can be calculated from the values of the internal buffers of the respective neurons at a given time. Using the movement vectors obtained from the vector sum, the movement of the object is controlled. For this reason, a movement approximate to the complex movement of, e.g., a living body can be realized.

In the chaotic information processing unit of the present invention, upon calculation of a complex movement of, e.g., a living body, various movements (motions) can be easily calculated by setting a small number of parameters. When this movement is to be changed, no drastic modification of a program is required.

Furthermore, the chaotic information processing unit can calculate the movement vectors for determining the movement of an object on the basis of an external stimulus applied to a specific neuron forming the neural network. For this reason, a movement (motion) approximate to a complex movement of, e.g., a living body can be calculated.

Moreover, the chaotic information processing unit can calculate the movement vectors of a plurality of objects by applying a stimulus from an external environment to specific neurons. For this reason, the movements of a plurality of objects under the influence of the external environment can be realized and analyzed by setting a small number of parameters.

In addition, in the group movement control method of the present invention, the movement vectors of objects are calculated on the basis of influences interacting among a plurality of objects. For this reason, the complex movements of a group of, e.g., living bodies can be realized using a plurality of objects.

What is claimed is:

1. A movement control method for moving an object, comprising the steps of:

obtaining time-series data from a calculation that generates chaotic oscillation; and calculating a movement vector for controlling movement of the object using said time-series data, wherein the step of calculating the movement vector comprises the steps of:

setting a neural network which connects a plurality of neurons to each other;

causing the neurons to perform calculations that generate chaotic oscillation; and setting the neurons in correspondence with moving directions of the object, wherein information is externally supplied to a neuron in the neural network, and the neurons perform the calculations that generate chaotic oscillation in this condition, and wherein the time-series data used in calculating the movement vector of the object is obtained based on the formulas below:

$$p_i(n+1) = F_{q_i(n)}\{p_i(n)\}$$

$$q_i(n) = -\frac{1}{T_{ii}}\left\{\sum_{j \neq i} T_{ij}p_j(n) + \alpha + I_i(n)\right\}$$

$$F_q(p) = \gamma p + (1-\gamma)\left(1 - \frac{1}{2}\left\{1 + \tanh\left(\frac{p-q}{2\beta}\right)\right\}\right)$$

where $p_i$ is a value of an internal buffer of the i-th neuron;

$T_{ij}$ is a value of synaptic connection from the j-th neuron to the i-th neuron;

$I_i$ is external information supplied to the i-th neuron;

$q_i$ is an intermediate function;

$F_q$ is a function for determining the next state of each neuron;

n is a lapse of discrete time;

$\alpha$ is an offset value;

$\beta$ is gain; and $\gamma$ is an attenuation coefficient.

2. A method according to claim 1, further comprising:

moving the object based on said movement vector.

3. A chaotic information processing unit for controlling movement of an object, comprising:

a neural network which connects a plurality of chaotically oscillating neurons to each other;

a calculation device for calculating states of internal buffers of the neurons at a given timing with development of said neural network over time, and for calculating a movement vector for controlling movement of the object from the calculated states; and a device for inputting externally input information to a neuron in said neural network, wherein said calculation device performs a calculation that generates chaotic oscillation based on the input information and the states of the internal buffers, and wherein said calculation device calculates the movement vector of the object based on the formulas below:

$$p_i(n+1) = F_{q_i(n)}\{p_i(n)\}$$

$$q_i(n) = -\frac{1}{T_{ii}}\left\{\sum_{j \neq i} T_{ij}p_j(n) + \alpha + I_i(n)\right\}$$

$$F_q(p) = \gamma p + (1-\gamma)\left(1 - \frac{1}{2}\left\{1 + \tanh\left(\frac{p-q}{2\beta}\right)\right\}\right)$$

where $p_i$ is a value of the internal buffer of the i-th neuron;

$T_{ij}$ is a synaptic connection from the j-th neuron to the i-th neuron;

$I_i$ is external information supplied to the i-th neuron;

$q_i$ is an intermediate function;

$F_q$ is a function for determining the next state of each neuron;

n is a lapse of discrete time;

$\alpha$ is an offset value;

$\beta$ is gain; and $\gamma$ is an attenuation coefficient.

4. A unit according to claim 3, further comprising:

a movement device which moves the object based on said movement vector.

* * * * *